(12) United States Patent
Sato et al.

(10) Patent No.: US 7,236,516 B2
(45) Date of Patent: Jun. 26, 2007

(54) RAKE RECEIVER DEVICE

(75) Inventors: Takaharu Sato, Chiba (JP); Hisashi Kondoh, Chiba (JP)

(73) Assignee: Kawasaki Microelectronics, Inc., Chiba (JP)

( * ) Notice: Subject to any disclaimer, the term of this patent is extended or adjusted under 35 U.S.C. 154(b) by 804 days.

(21) Appl. No.: 10/363,905

(22) PCT Filed: Jan. 11, 2002

(86) PCT No.: PCT/JP02/00128

§ 371 (c)(1),
(2), (4) Date: Mar. 10, 2003

(87) PCT Pub. No.: WO02/056493

PCT Pub. Date: Jul. 18, 2002

(65) Prior Publication Data

US 2003/0176171 A1 Sep. 18, 2003

(30) Foreign Application Priority Data

Jan. 16, 2001 (JP) .............................. 2001-007541
Aug. 6, 2001 (JP) .............................. 2001-237578

(51) Int. Cl.
 H04B 1/69 (2006.01)
 H04B 1/707 (2006.01)
 H04B 1/713 (2006.01)
(52) U.S. Cl. ...................... 375/148; 375/144; 375/150; 375/349; 370/320; 370/335; 370/342

(58) Field of Classification Search ................ 375/144, 375/147, 148, 150, 349; 370/320, 335, 342, 370/441, 479
See application file for complete search history.

(56) References Cited

U.S. PATENT DOCUMENTS

| 5,764,687 | A  | * | 6/1998  | Easton ........................ 375/147 |
| 6,122,311 | A  |   | 9/2000  | Watanabe et al. |
| 6,330,271 | B1 | * | 12/2001 | Klang et al. ................. 375/134 |
| 6,470,000 | B1 | * | 10/2002 | Burns et al. ................. 370/342 |
| 6,618,431 | B1 | * | 9/2003  | Lee ............................ 375/147 |
| 7,054,351 | B1 | * | 5/2006  | Braam et al. ................ 375/144 |

FOREIGN PATENT DOCUMENTS

| EP | 0 848 503 A2 | 6/1998 |
| JP | A 10-209919 | 8/1998 |
| JP | A 11-331124 | 11/1999 |
| WO | WO 95/12262 | 5/1995 |
| WO | WO 97/01227 | 1/1997 |
| WO | WO0025435 | * 5/2000 |

* cited by examiner

Primary Examiner—Phuong Phu
(74) Attorney, Agent, or Firm—Oliff & Berridge, PLC

(57) ABSTRACT

A RAKE receiver device includes a plurality of fingers for demodulating multipath receive data, and a data synthesis circuit for synthesizing the receive data from each of the paths and demodulated by the plural fingers. Each time the receive data is demodulated by one of the plural fingers, the data synthesis circuit adds cumulatively the demodulated receive data for each identical receive data from each of the paths, and synthesizes the data.

10 Claims, 5 Drawing Sheets

RAKE RECEIVER DEVICE

BACKGROUND OF THE INVENTION

1. Field of the Invention

The present invention relates to a RAKE receiver device used in a mobile communications system employing spectrum spreading technology.

2. Description of the Related Art

In communications method employing spectrum spreading technology, modulated and spread data (i.e., a signal) is sent from a sending end, and the data received on a receiving end is de-spread and demodulated, whereby sending and receiving of data is performed. In the communications method employing such spectrum spreading technology, the frequency spectrum of the data is spread into a wide range so that excellent anti-interference property and communications privacy are ensured, thus having an advantage that multiple users can share a channel in the same frequency band. Therefore, in recent years, this communications method has been widely utilized in a mobile communications system such as a portable telephone or the other thing.

An example of the communications method utilizing this spectrum spreading technology includes CDMA (Code Division Multiple Access).

Incidentally, in mobile communications, wireless communication using radio waves is performed between a base station and a terminal such as a portable telephone or the other thing. In this case, the radio waves may arrive at the receiving end by propagating linearly or by being reflected by a construction such as a building or the other thing for example. Therefore, the receiving end receives multiple signals which have been transmitted through a plurality of paths (multiple paths). Since these radio waves have time lags (phase differences) caused by the differences in the distances they have traveled, a phenomenon called fading occurs such that they strengthen each other when they are in phase with each other, and when they are out of phase from each other they weaken each other.

By contrast, in the mobile communications system that utilizes the spectrum spreading technology, there is used a method called a RAKE receiver system, in which a plurality of receive data transmitted through multiple paths are synthesized to thereby improve quality of communication. A RAKE receiver device which employs the RAKE receiver system has a plurality of fingers corresponding to the number of associated paths, and each of the fingers demodulates receive data from each associated path. The phase differences of the received and demodulated data are corrected, and the data which phase differences have been corrected are synthesized.

For example, a receiver device, a receiver method and a terminal device of a portable telephone system disclosed in JP 10-209919 A, and a CDMA system communications apparatus disclosed in JP 11-331124 A are known as conventional techniques employing the RAKE receiver system.

Each of the RAKE receiver devices disclosed in these publications has one memory provided for each finger, for storing the receive data. The receive data from each path and demodulated by the finger for each path is held in each memory associated with that finger. After the receive data from the chronologically last path has been stored in the memory, identical receive data are read out from all memories, and the identical receive data from all the paths are added together and synthesized.

Thus, in the conventional RAKE receiver device, a massive amount of memory is used for each finger. Therefore, there was a problem that the scale of the circuitry increased, and, as a result, power consumption was enormous as well.

SUMMARY OF THE INVENTION

It is an object of the present invention to provide a RAKE receiver device which resolves the problems with the above-mentioned conventional technique, so as to reduce the scale of the circuitry and therefore power consumption.

In order to achieve the above-mentioned object, according to the present invention, there is provided a RAKE receiver device comprising: a plurality of fingers for demodulating receive data from multiple paths; and a data synthesis circuit for synthesizing the receive data from each of the paths and demodulated by the plurality of fingers, wherein each time that the receive data of each path is demodulated by one of the plurality of fingers, the data synthesis circuit adds cumulatively the demodulated receive data for each identical receive data from each of the paths, and synthesizes the data.

Further, according to the present invention, there is provided a RAKE receiver device comprising: a plurality of fingers for demodulating receive data of multiple paths; a data synthesis circuit for synthesizing the receive data from each of the paths and demodulated by the plurality of fingers; and a timing adjustment circuit for adjusting timing when the receive data from each of the paths and demodulated by the plurality of fingers are provided to the data synthesis circuit, wherein that the timing adjustment circuit holds the receive data from each of the paths and demodulated by the fingers; and each time that the receive data from each of the paths and demodulated by the plurality of fingers are supplied from the timing adjustment circuit, the data synthesis circuit adds cumulatively the demodulated receive data for each identical receive data from each of the paths, and synthesizes the data.

Here, it is preferable that the data synthesis circuit comprises one memory that is shared by the fingers, and each time the receive data from each of the paths are demodulated by the plurality of fingers, cumulatively added data is read out from each corresponding memory address, added to the demodulated identical receive data from each of the paths, and written back into the same respectively corresponding address of the memory.

Further, it is desirable that the fingers are set in advance with priority order, and the data synthesis circuit adds cumulatively, one at a time and in chronological order, the identical receive data from each of the paths and demodulated by the plurality of fingers, and when two or more demodulated receive data from each of the paths are inputted simultaneously, the data synthesis circuit sequentially adds cumulatively the demodulated receive data from each of the paths for each identical receive data, according to the priority order.

Further, according to the present invention, there is provided a RAKE receiver device comprising: a plurality of fingers for demodulating receive data from multiple paths; a data synthesis circuit for synthesizing the receive data from each of the paths and demodulated by the plurality of fingers; and a timing adjustment circuit for adjusting timing when the receive data from each of the paths and demodulated by the plurality of fingers are provided to the data synthesis circuit, wherein the plurality of fingers demodulate a plurality of receive data per 1 symbol time unit, the timing adjustment circuit holds the plurality of receive data from each of the paths and demodulated by the plurality of fingers, and each time that the receive data from each of the paths and demodulated by the plurality of fingers are supplied from the timing adjustment circuit, the data synthesis circuit adds cumulatively the demodulated receive data for each identical receive data from each of the paths, and synthesizes the data.

Here, it is desirable that the data synthesis circuit comprises one memory shared by the plurality of fingers, wherein each time that the receive data from each of the paths and demodulated by the plurality of fingers are supplied from the timing adjustment circuit, cumulatively added data is read out from each corresponding memory address, added to the demodulated identical receive data from each of the paths, and written back into the same respectively corresponding address of the memory.

Further, it is preferable that the plurality of fingers and the plurality of receive data are each set in advance with priority order, the data synthesis circuit receives from the timing adjustment circuit the demodulated receive data from each of the paths and adds cumulatively them one at a time and in chronological order, when two or more of the demodulated receive data from each of the paths are held in the timing adjustment circuit, the data synthesis circuit sequentially receives, from the timing adjustment circuit, the same-priority-order demodulated receive data of the plurality of fingers according to the priority order of the fingers, further repeats this operation according to the priority order of the receive data, and sequentially adds cumulatively the demodulated receive data from each of the paths for each identical receive data.

DETAILED DESCRIPTION OF THE PREFERRED EMBODIMENTS

Hereinafter, a RAKE receiver device according to the present invention will be described in detail, based on preferred embodiments thereof illustrated in the attached drawings.

Figure 1:
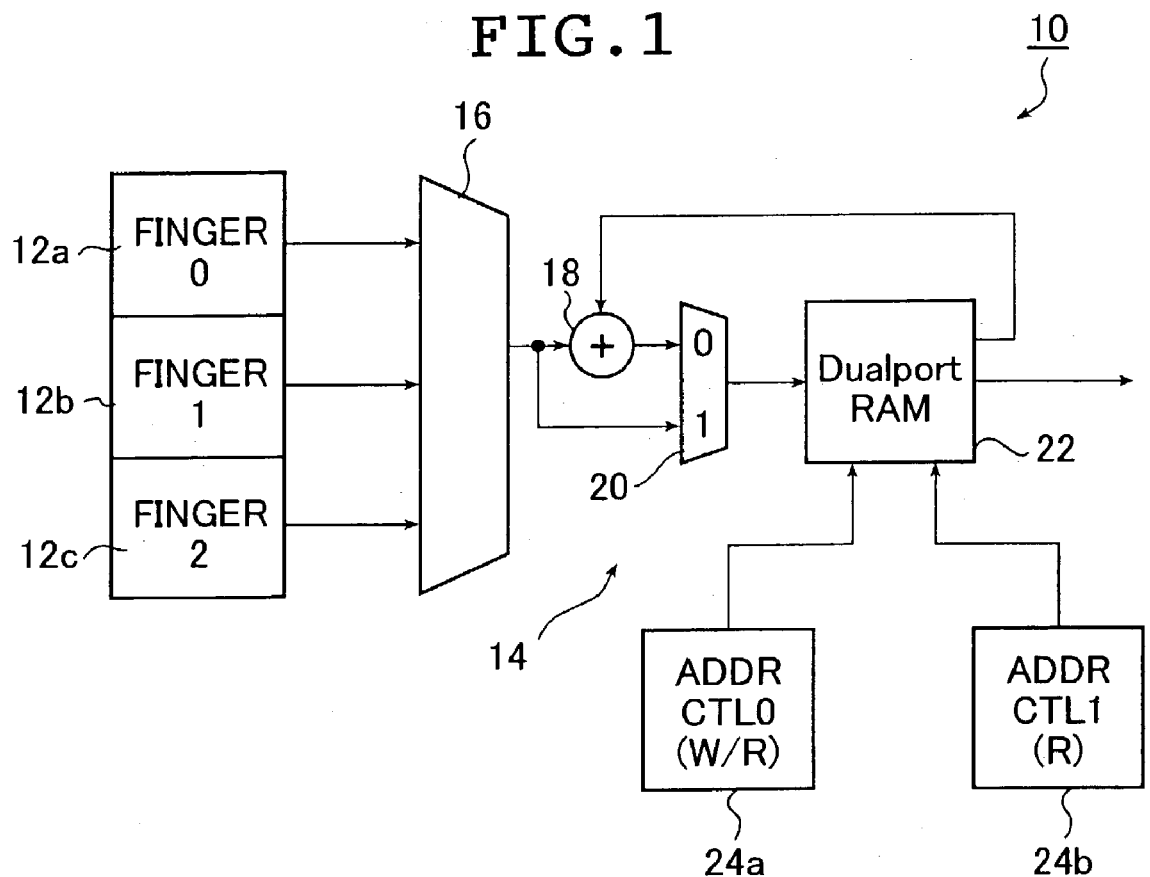
FIG. 1 is a constructional outline diagram of an embodiment of the RAKE receiver device according to the present invention.

FIG. 1 is a constructional outline diagram of an embodiment of a RAKE receiver device of the present invention.

A RAKE receiver device 10 shown in the diagram has three fingers (FINGER 0, FINGER 1, FINGER 2) 12*a*, 12*b*, and 12*c* and a data synthesis circuit 14. According to the RAKE receiving method, each time receive data is demodulated by one of the plural fingers, the RAKE receiver device cumulates and synthesizes the demodulated data for identical receive data of each path.

In the RAKE receiver device 10 shown in the diagram, each of the fingers 12*a*, 12*b*, and 12*c* demodulate multipath receive data. The demodulated receive data are inputted into the data synthesis circuit 14. Note that, for the fingers, any of the conventional, publicly known constructions may be used. Further, in the example shown in the diagram, three fingers 12*a*, 12*b*, and 12*c* corresponding to three paths are provided, but the number of the fingers may be modified appropriately as needed.

On the other hand, the data synthesis circuit 14 has a selector 16, an adder 18, a selector 20, a memory (a dualport RAM) 22, and two address controllers (ADDR CTL 0,1) 24*a* and 24*b*. Each time the receive data is demodulated by one of the fingers 12*a*, 12*b*, and 12*c*, the data synthesis circuit 14 cumulates and synthesizes the demodulated receive data for each identical receive data in each path.

Here, the demodulated receive data of each path, which are inputted from the fingers 12*a*, 12*b*, and 12*c*, are outputted one by one in chronological sequence from the selector 16. Further, in a case where the demodulated receive data are inputted simultaneously from a plurality of the fingers, the demodulated receive data is outputted in sequence selectively starting with the demodulated receive data from the highest priority finger, according to the predetermined order of priority with respect to the fingers 12*a*, 12*b*, and 12*c*. There is no restriction regarding the order of priority, but, in this embodiment, it is finger 12*a*, 12*b*, and then finger 12*c*, in order of decreasing priority.

Then, the receive data of each path and demodulated by one of the fingers 12*a*, 12*b*, and 12*c* are inputted to the adder 18 in sequence via the selector 16. The adder 18 adds the demodulated data and demodulated identical receive data from another path or data obtained by cumulatively adding together identical receive data from a plurality of other paths, which has been read out from the memory 22 by control from the address controller 24*a*, as will be described in detail below. An output signal from the adder 18 is inputted into a terminal 0 of the subsequent selector 20.

The selector 20 selectively outputs either the output signal from the adder 18 that was inputted into the terminal 0 thereof, or an output signal of the selector 16 that was inputted into a terminal 1 thereof. At the time when the first receive data has been demodulated by one of the fingers 12*a*, 12*b*, and 12*c*, the memory 22 is not holding demodulated receive data from other paths that are identical data with the first demodulated receive data. In this case, the output signal from the selector 16 is outputted via the selector 20. In any other case, the output signal from the adder 18 is outputted via the selector 20.

The memory 22 holds the output signal from the selector 20 by a control of the address controllers 24*a* and 24*b*. Therefore, in the case of the example shown in the diagram, a dualport RAM is used as the memory 22. The data read out from the memory 22 by the control of the address controller 24*a* is inputted into the adder 18 as described above. The data that was read out from the memory 22 by the control of the address controller 24*b* is outputted as a synthesized data.

The address controllers 24*a* and 24*b* control an operation of the memory 22 as described above. Here, the address controller 24*a* controls the writing (W) of the output signal from the selector 20 to the memory 22, and the reading (R) of the data from the memory 22 which is inputted into the adder 18. The address controller 24*b* controls the reading (R) of the data from the memory 22 which is to become the synthesized receive data from the RAKE receiver device 10.

Note that, in accordance with this embodiment, the dual port RAM is used as the memory 22, and the two address controllers 24a and 24b are used to control the operation of the dual port RAM. However, the invention is not limited to this configuration. For example, if a function is added for arbitrating between the address controller 24a and the address controller 24b, then a single port RAM may also be used as the memory 22. Further, it is also possible to control the operation of the memory 22 with one address controller.

Next, an operation of the RAKE receiver device 10 according to the present invention will be described, referring to a conceptual diagram shown in FIG. 2.

Figure 2:
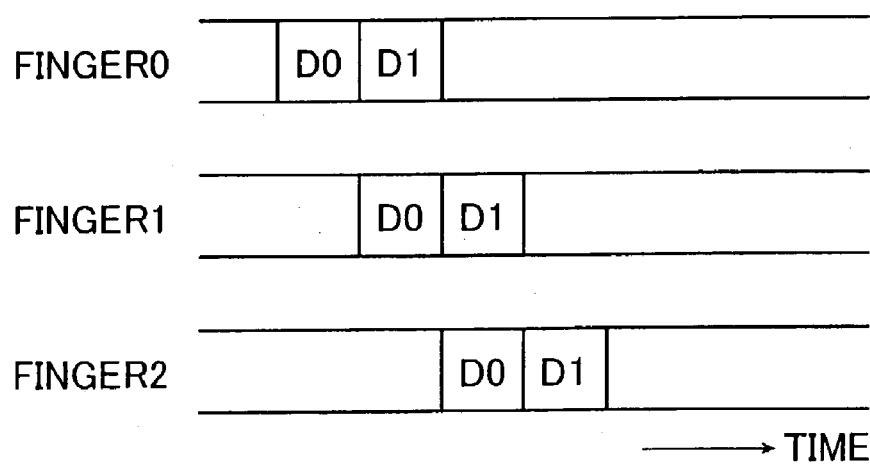
FIG. 2 is a conceptual diagram showing timing of receive data demodulated by each finger, according to an embodiment of the invention.

In an example shown in FIG. 2, receive data is demodulated by the finger 12a (FINGER 0), in the order of receive data D0, and then receive data D1. Further, the receive data D0 is demodulated by the finger 12b (FINGER 1) at a timing when the finger 12a demodulates the receive data D1, and then D1 is demodulated by the finger 12b. Similarly, the receive data D0 is demodulated by the finger 12c (FINGER 2) at a timing when the finger 12b demodulates the receive data D1, and then D1 is demodulated by the finger 12c.

First, the receive data D0 is demodulated by the finger 12a. This receive data D0 is the first receive data D0 of three receive data D0 which are to be demodulated by all the fingers 12a, 12b, and 12c. Therefore, the memory 22 does not have the demodulated receive data D0 from the other paths except this path. Therefore, this demodulated receive data D0 is inputted to the memory 22 via the selectors 16, 20, and is written into its address 0 by the control of the address controller 24a.

At this point, the address 0 of the memory 22 holds the receive data D0 demodulated by the finger 12a.

Then, at a timing when the receive data D1 is demodulated by the finger 12a, the receive data D0 is demodulated by the finger 12b. As described already, in accordance with this embodiment, the priority order is set as finger 12a, 12b, and then 12c, in that order. Therefore, the receive data D1 demodulated by the finger 12a is first outputted from the selector 16, and then the receive data D0 demodulated by the finger 12b is outputted next.

Note that, processing time needed for the data synthesis circuit 14 to synthesize the demodulated receive data is extremely shorter than processing time needed for the fingers 12a, 12b, and 12c to demodulate the receive data. Therefore, even in a case where two receive data are demodulated simultaneously, no problem will occur, even if the simultaneously demodulated receive data are processed in order according to the order of priority. This is the same in the case where three or more receive data are demodulated simultaneously.

As described above, first, the receive data D1 that was demodulated by the finger 12a is processed by the data synthesis circuit 14. The demodulated receive data D1 is the first demodulated receive data D1 from among the three receive data D1 to be demodulated by all the fingers 12a, 12b, and 12c, like the demodulated receive data D0. Therefore, it is inputted into the memory 22 via the selector 20, and written into the address 1 of the memory 22 by the control of the address controller 24a.

At this point, the address 1 of the memory 22 holds the receive data D1 demodulated by the finger 12a.

Next, the receive data D0 demodulated by the finger 12b is processed. Since this demodulated receive data D0 is not the first demodulated receive data D0, it is inputted into the adder 18. At this time, the demodulated receive data D0 being held in the address 0 of the memory 22 is read out and inputted into the adder 18 by the control of the address controller 24a. Then, the both receive data D0 are added together by the adder 18, inputted into the memory 22 via the selector 20, and written again into the same address 0.

At this point, the address 0 of the memory 22 holds data produced by adding the receive data D0 demodulated by the finger 12a and the receive data D0 demodulated by the finger 12b.

Note that, since the demodulated receive data D0 and the demodulated receive data D1 are different data, they are held respectively in different addresses 0 and 1 of the memory 22. Further, the receive data D0 of each path demodulated by the fingers 12a, 12b, and 12c are the same data. Therefore, they are added cumulatively and written into the same address 0 of the memory 22. Similarly, since the receive data D1 of each path demodulated by the fingers 12a, 12b, and 12c are the same data, they are added cumulatively and written into the identical address 1 of the memory 22.

Then, at a timing when the receive data D1 is demodulated by the finger 12b, the receive data D0 is demodulated by the finger 12c. From the selector 16, the receive data D1 demodulated by the finger 12b is outputted first, and then the receive data D0 demodulated by the finger 12c is outputted in sequence.

First, the receive data D1 demodulated by the finger 12b is processed. Since this demodulated receive data D1 is not the first demodulated receive data D1, it is inputted into the adder 18. At the same time, the demodulated receive data D1 being held in the address 1 of the memory 22 is read out and inputted into the adder 18 by the control of the address controller 24a. Then, the both demodulated receive data D1 are added together by the adder 18, inputted into the memory 22 via the selector 20, and written again into the same address 1.

At this point, the address 1 of the memory 22 holds data produced by adding together the receive data D1 demodulated by the finger 12a and the receive data D1 demodulated by the finger 12b.

Next, the receive data D0 demodulated by the finger 12c is processed. Since this demodulated receive data D0 is also not the first demodulated receive data D0, it is inputted into the adder 18. At the same time, the demodulated receive data D0 being held in the address 0 of the memory 22 is read out and inputted into the adder 18 by the control of the address controller 24a. Then, the both demodulated receive data D0 are added together by the adder 18, inputted into the memory 22 via the selector 20, and written again into the same address 0.

At this point, the address 0 of the memory 22 holds data produced by adding cumulatively all the receive data D0 demodulated by each of the fingers 12a, 12b, and 12c.

After the data obtained by adding cumulatively all the demodulated receive data D0 is written into the address 0 of the memory 22, the demodulated receive data D0 being held in the address 0 of the memory 22 is read out and outputted as synthesized demodulated receive data D0 by the control of the address controller 24b.

Finally, the receive data D1 is demodulated by the finger 12c. Since this demodulated receive data D1 is also not the first demodulated receive data D1, it is inputted into the adder 18. At the same time, the demodulated receive data D1 being held in the address 1 of the memory 22 is read out and inputted into the adder 18 by the control of the address controller 24a. Then, the both demodulated receive data D1 are added together by the adder 18, inputted into the memory 22 via the selector 20, and written again into the same address 1.

At this point, the address 1 of the memory 22 holds data produced by adding cumulatively all the receive data D1 demodulated by each of the fingers 12a, 12b, and 12c.

After the data produced by adding cumulatively the demodulated receive data D1 is written into the address 1 of the memory 22, the demodulated receive data D1 being held in the address 1 of the memory 22 is similarly read out and outputted as the synthesized demodulated receive data D1 by the control of the address controller 24b.

Next, referring to another example of the RAKE receiver device according to the present invention, for example, time division processing in which multiple receive data are demodulated by plural fingers per one symbol time unit will be described.

For example, in a case where data that has been modulated by a QPSK (Quadrature Phase Shift Keying) method is sent from a sending source such as a base station or other, two signals I and Q are simultaneously demodulated per one symbol time unit by the fingers at a reception point such as a mobile phone or other.

Therefore, in the communications employing the QPSK method, two receive data are simultaneously demodulated by respective fingers, and these two demodulated receive data are outputted as a unit in sequence from the fingers.

Further, in standard specifications for 3rd generation mobile communications systems (3GPP), there is employed a diversity method communications technique in which the base station uses two antennas at maximum to send a downlink signal. In STTD (space time transmit diversity) that is one open-loop mode of the diversity method, for example, one data per symbol time unit is sent from each of the base station's two antennas, that is, a total of two data per symbol time unit are sent to the mobile phone.

Further, one of the two data sent from these two antennas is sent just as it is, for example, and the other one is sent after chronologically switching the sequence of data of two symbol time units, inverting the positivity and negativity, and performing complex conjugate processing. Therefore, at the mobile phone, when the two data for the one symbol time unit from the two antennas are received, demodulation of the data cannot be executed at that point, but the data can be demodulated at the time when the total of four data for two symbol time unit units are received.

Therefore, in the case where STTD is used in the 3GPP, the four receive data are simultaneously demodulated by each of the fingers, and the demodulated four receive data are outputted as a unit in sequence from the fingers.

The following description is directed to an example in which four receive data are simultaneously demodulated per two symbol time units (i.e., two receive data per one symbol time unit) by four fingers, as in the abovementioned case where the STTD is used in the 3GPP.

Figure 3:
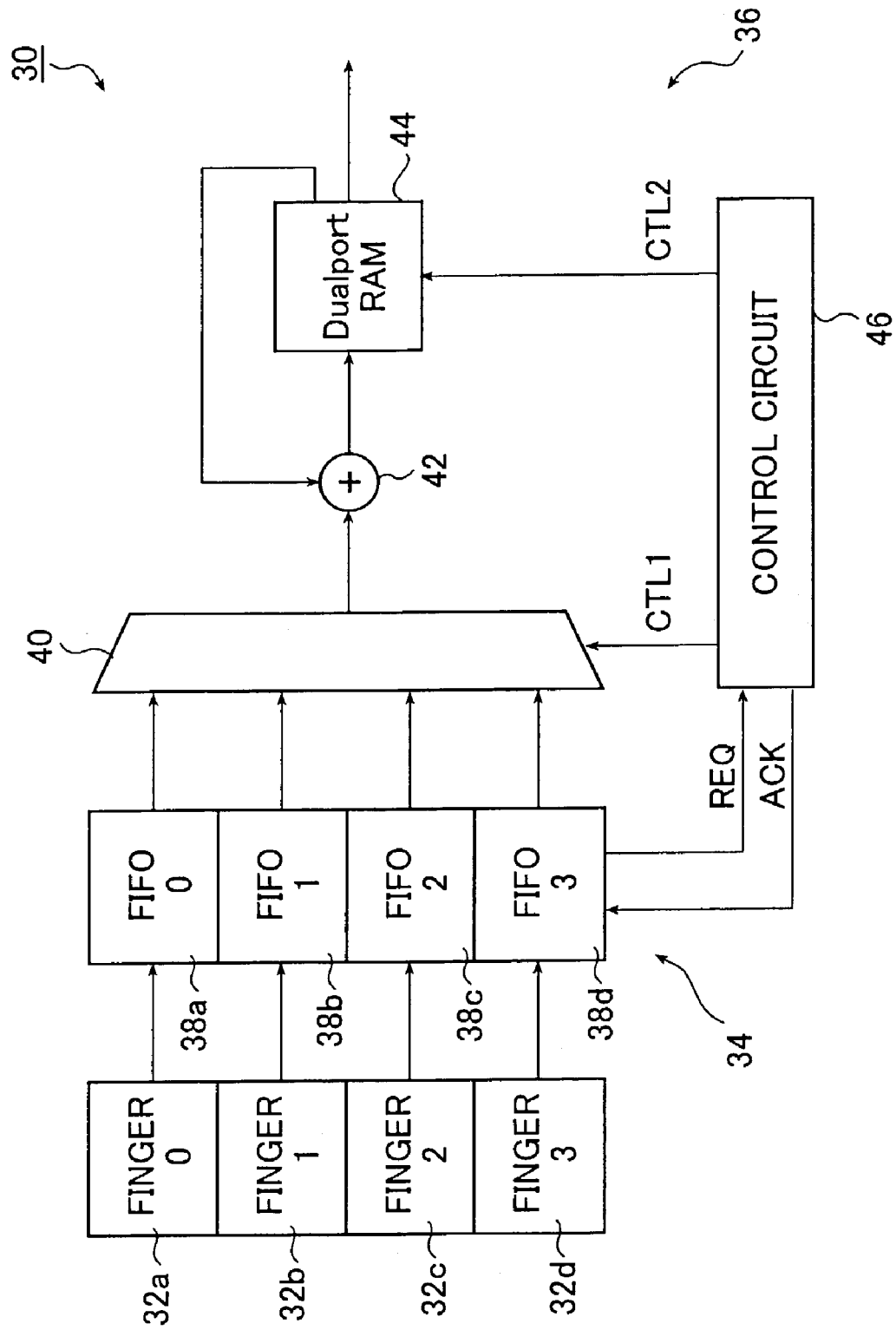
FIG. 3 is a constructional outline diagram of another embodiment of the RAKE receiver device of the present invention.

FIG. 3 is a constructional outline diagram of another embodiment of the RAKE receiver device according to the present invention.

A RAKE receiver device 30 shown in FIG. 3 represents an adaptation of the RAKE receiver device 10 shown in FIG. 1 such that it is further configured to adjust timing when receive data demodulated by the fingers are outputted to the data synthesis circuit. The RAKE receiver device 30 has four fingers (FINGER 0, FINGER 1, FINGER 2, and FINGER 3) 32a, 32b, 32c, and 32d, a timing adjustment circuit 34, and a data synthesis circuit 36.

In the RAKE receiver device 30 shown in FIG. 3, the fingers 32a, 32b, 32c, and 32d differ from the fingers 12a, 12b, and 12c shown in FIG. 1 only in that their number has been modified from 3 to 4. Note that, the number of the fingers is subject to no restriction as far as it is two or larger. The demodulated receive data which are outputted from the fingers 32a, 32b, 32c, and 32d are inputted into the timing adjustment circuit 34.

The timing adjustment circuit 34 adjusts the timing when the demodulated receive data of each path inputted from the fingers 32a, 32b, 32c, and 32d are outputted to the data synthesis circuit 36. The timing adjustment circuit 34 includes four FIFO (First-In First-Out) devices 38a, 38b, 38c, and 38d corresponding to each of the fingers 32a, 32b, 32c, and 32d. Note that, the timing adjustment circuit 34 is not restricted to the FIFO devices, and any memory circuit may be used such as a dual-port RAM or register file or others.

Further, each time the receive data demodulated by the fingers 32a, 32b, 32c, and 32d are provided from the timing adjustment circuit 34, the data synthesis circuit 36 adds cumulatively and synthesizes the demodulated receive data for each of identical receive data of each path. The data synthesis circuit 36 includes a selector (a priority encoder) 40, an adder 42, a memory 44, and a control circuit 46.

Here, output signals of the selector 40 and the memory 44 are inputted into the adder 42, and an output signal from the adder 42 is inputted into the memory 44. Further, from the memory 44, the demodulated receive data which has been synthesized is outputted. A request signal REQ from the timing adjustment circuit 34 is inputted into the control circuit 46. From the control circuit 46, control signals CTL1 and CTL2 are outputted to the selector 40 and to the memory 44, and an acknowledge signal ACK is outputted to the timing adjustment circuit 34.

The data synthesis circuit 36 differs from the data synthesis circuit 14 shown in FIG. 1 in the following three points. Namely, the data synthesis circuit 36 is not provided with a constituent element corresponding to the selector 20. Also, the memory 44 has a function for initializing data in each of its addresses. Further, in addition to the function of the address controllers 24a and 24b of the data synthesis circuit 14 shown in FIG. 1, the control circuit 46 has a function for controlling processing for receiving the demodulated receive data by means of a handshaking with the above-mentioned timing adjustment circuit 34.

Before starting to add cumulatively the demodulated receive data for each identical receive data of each path, in the data synthesis circuit 36, the control signal CTL2 is given from the control circuit 46 to the memory 44, so that the data being held in the corresponding address of the memory 44 is initialized (for example, set to "0"). When the cumulation addition is performed, first demodulated receive data among the identical receive data and initialized data being held in the memory 44 are added together, and this is held again in the corresponding address of the memory 44.

As described above, in the data synthesis circuit 36, the memory 44 has a function to initialize the data being held in each address. However, the invention is not limited to this configuration. For example, it is also possible to achieve this function by configuring the data synthesis circuit 36 so that it is equivalent in function to the selector 20 of the data synthesis circuit 14 shown in FIG. 1. Note that, the operation of the data synthesis circuit 36 is the same as the operation of the data synthesis circuit 14 shown in FIG. 1, except the control of the processing performed with the timing adjustment circuit 34. Therefore, detailed explanation thereof is omitted.

Next, an operation of the RAKE receiver device 30 shown in FIG. 3 will be described.

Figure 4:
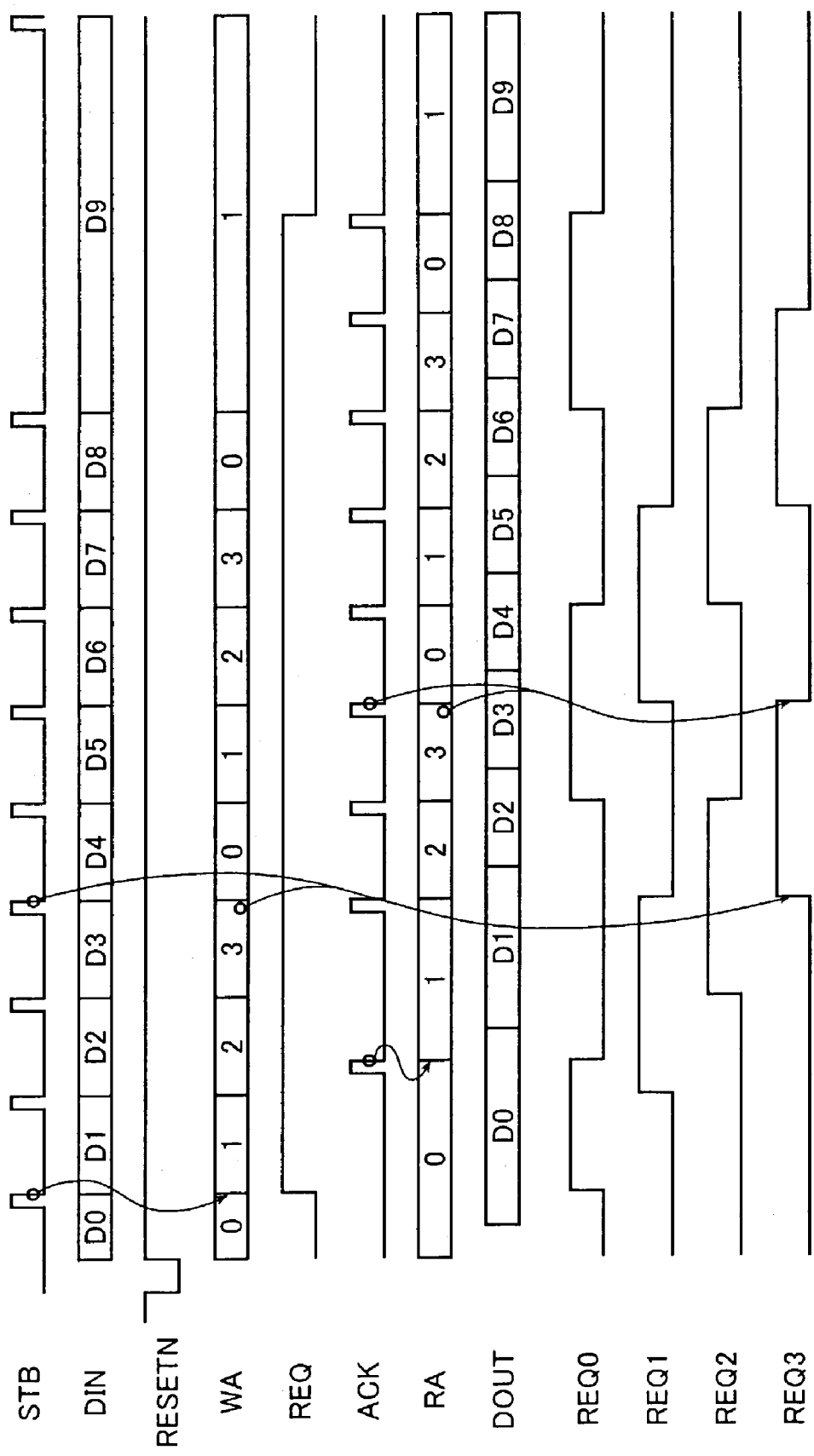
FIG. 4 is a timing chart showing operation of a FIFO device, according to an embodiment of the invention.

First, referring to a timing chart shown in FIG. 4, the operation of the RAKE receiver device 30 will be explained by focusing on one FIFO device 38a in the timing adjustment circuit 34. In the following explanation, it is assumed that demodulated receive data D0 to D3, D4 to D7, and so on are inputted in this sequence from the finger 32a to the FIFO device 38a, as shown in FIG. 4, in units composed of four data.

The data synthesis circuit 36 is reset by a low-level signal of a signal RESETN, to be initialized. Further, before starting to add cumulatively the demodulated receive data for each identical receive data of each path, the data synthesis circuit 36 supplies the control signal CTL2 from the control circuit 46 to the memory 44, as described above. In response to this, data in the corresponding address of the memory 44 is initialized. Here, it is assumed that the data in each address of the memory 44 is initialized to "0".

First, when the demodulated receive data D0 (DIN0) is inputted from the finger 32a to the FIFO device 38a, the demodulated receive data D0 is held in a write address WA0 of the FIFO device 32a. Then, a strobe signal STB is outputted, and the write address WA0 is increased in number at a falling timing of the strobe signal STB, thus changing to a write address WA1. At the same time, a request signal REQ0 changes to a high-level signal and the request signal REQ also changes to a high-level signal.

Here, request signals REQ0 to REQ3 are signals respectively corresponding to the first through the fourth demodulated receive data among the four demodulated receive data (e.g., D0 to D3), and they indicate that new demodulated receive data which should be added cumulatively by the data synthesis circuit 36 is being held in the FIFO device 38a. Further, the request signal REQ is an OR (i.e., disjunction) signal of these request signals REQ0 to REQ3, and it is provided to the control circuit 46 of the data synthesis circuit 36 as shown in FIG. 3.

When the request signal REQ is provided from the FIFO device 38a, the control signal CTL1 is provided from the control circuit 46 to the selector 40. In response to this, the demodulated receive data D0 (DOUT0) that was read out from the read address RA0 of the FIFO device 38a is selected by and outputted from the selector 40. This data D0 is added by the adder 42 to the initialized data "0" being held in the corresponding address of the memory 44, and the result of the addition, which is to say the data D0, is held once again in the same address of the memory 44.

Upon the completion of the writing of the addition result to the memory 44 (i.e., the cumulation addition of the data D0), the acknowledge signal ACK is given to the FIFO device 38a from the control circuit 46. In response to this, a read address RA0 of the FIFO device 38a is increased in number at a falling timing of the acknowledge signal ACK so as to change to a read address RA1, and at the same time the request signal REQ0 returns to a low-level signal.

The operation is similar thereafter. The remaining data D1 to D3 from the four data, which are the data D0 to D3 according to the timing chart shown in FIG. 4, are each held in the write addresses WA1 to WA3 of the FIFO device 38a respectively, and are read out from the read addresses RA1 to RA3 respectively. At the data synthesis circuit 36 they are added cumulatively for each identical receive data of each path. Further, the subsequent four data, which are the data D4 to D7 according to the example shown in FIG. 4, are similarly processed in sequence.

Next, an operation of the RAKE receiver device 30 will be described by focusing on mutual relationships between the four FIFO devices 38a, 38b, 38c, and 38d in the timing adjustment circuit 34, referring to timing charts shown in FIG. 5 and FIG. 6. In similar fashion, the demodulated receive data are simultaneously inputted from the fingers 32a, 32b, 32c, and 32d to the respectively corresponding FIFO devices 38a, 38b, 38c, and 38d, in sequence going from D0 to D3, D4 to D7, and so on, each in units composed of four data.

Here, the diagram of the RAKE receiver device 30 shown in FIG. 3 is simplified, but the request signal REQ is inputted to the control circuit 46 from each of the FIFO devices 38a, 38b, 38c, and 38d. Further, the acknowledge signal ACK is also inputted from the control circuit 46 into each of the FIFO devices 38a, 38b, 38c, and 38d, and the FIFO devices 38a, 38b, 38c, and 38d each operate according to independent timing.

Figure 5:
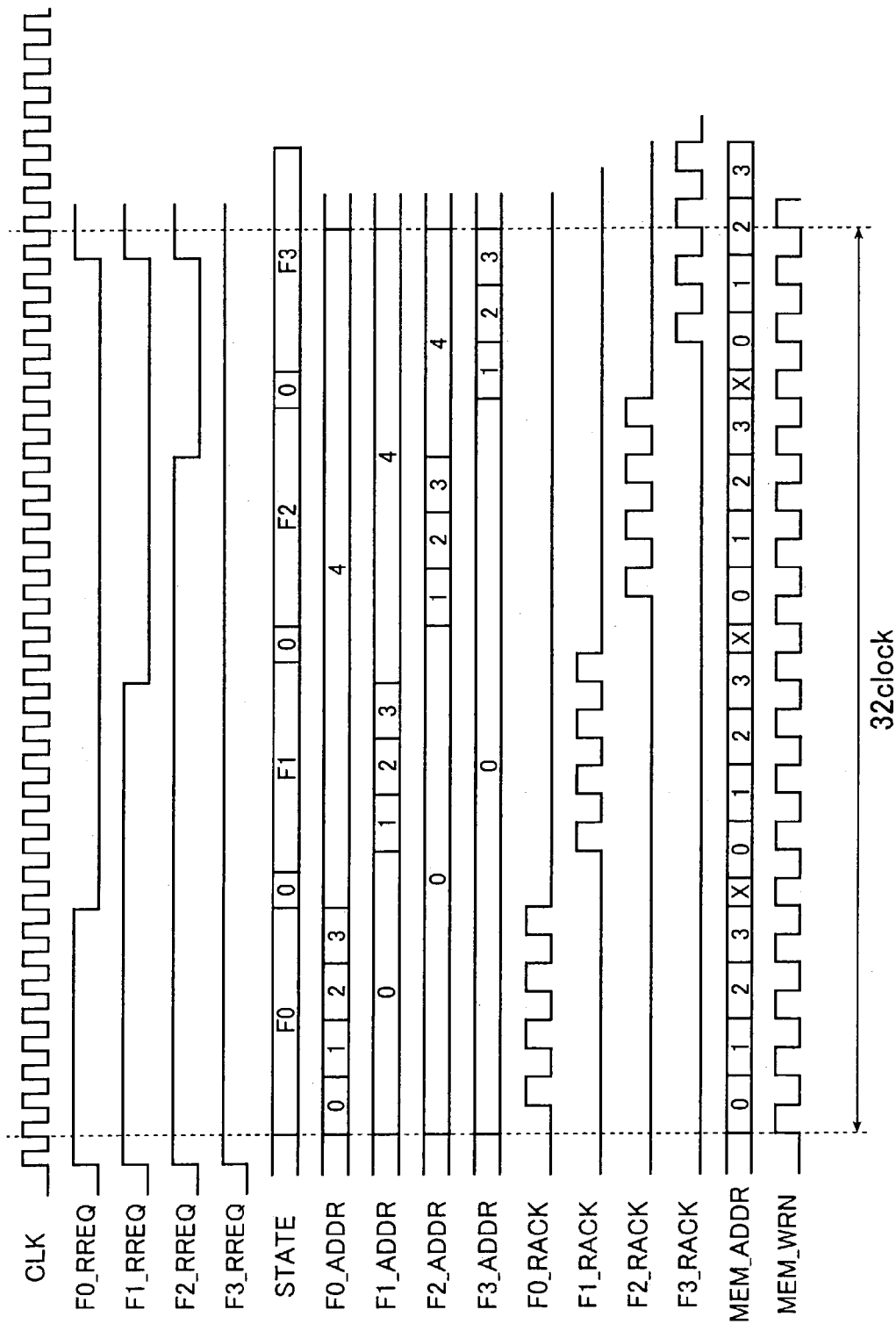
FIG. 5 is a timing chart showing operation of the RAKE receiver device shown in FIG. 3, according to an embodiment of the invention.
Figure 6:
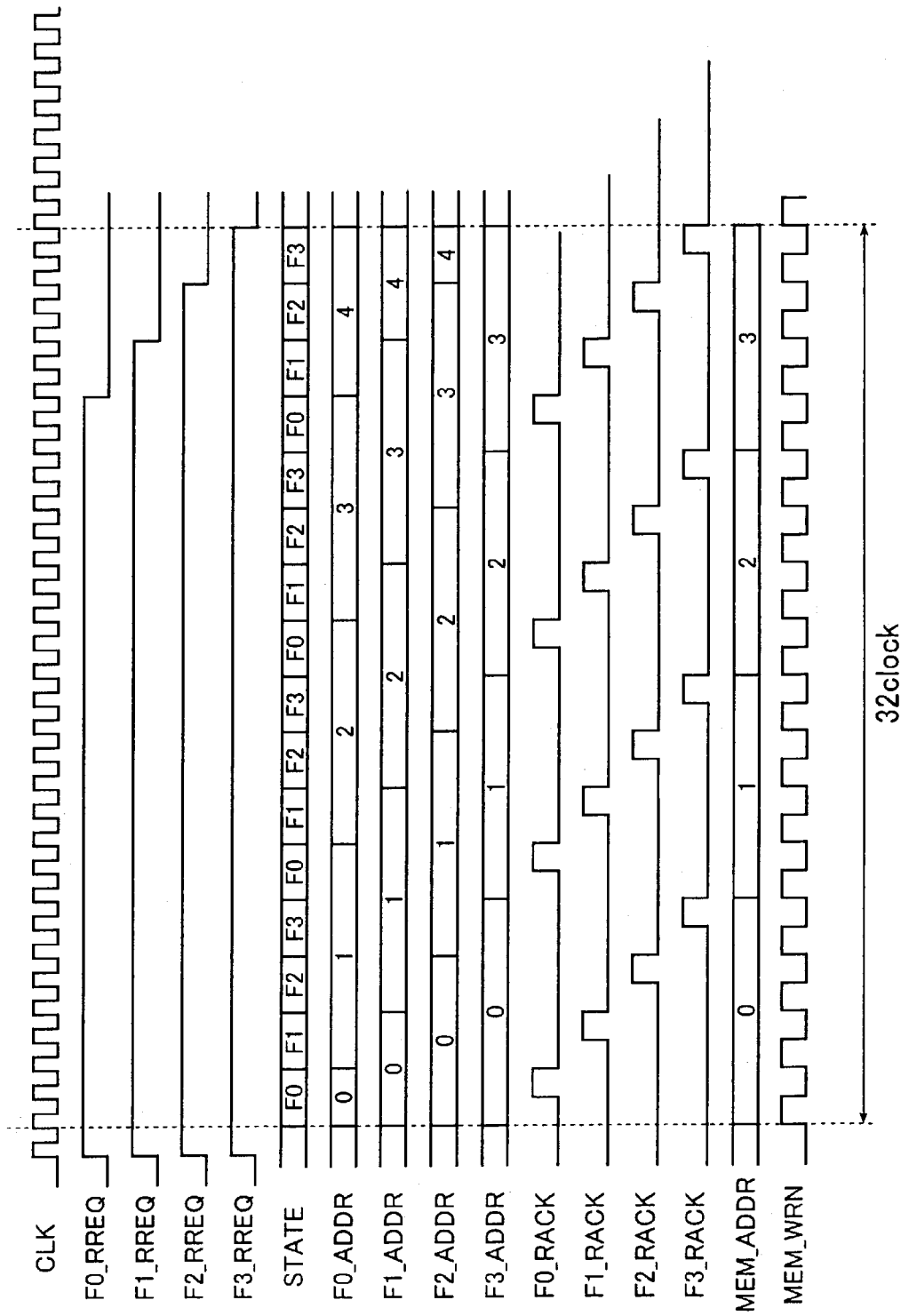
FIG. 6 is a timing chart showing operation of the RAKE receiver device shown in FIG. 3, according to another embodiment of the invention.

In the timing charts shown in FIG. 5 and FIG. 6, the request signals supplied from the FIFO devices 38a, 38b, 38c, and 38d to the control circuit 46 are referred to as F0_RREQ, F1_RREQ, F2_RREQ and F3_RREQ respectively. Further, the acknowledge signals provided from the control circuit 46 to each of the FIFO devices 38a, 38b, 38c, and 38d are referred to as F0_RACK, F1_RACK, F2_RACK and F3_RACK respectively.

Further, the read addresses of the FIFO devices 38a, 38b, 38c, and 38d are referred to as F0_ADDR, F1_ADDR, F2_ADDR and F3_ADDR respectively. Further, the address of the memory 44 is referred to as MEM_ADDR, and the write signal controlling the writing of the data to the memory 44 is referred to as MEM_WRN. Further, a clock signal serving as a reference for the processing is referred to as CLK, and a state signal indicating a transition state of the control circuit 46 is referred to as STATE.

Note that, in a case where the request signals F0_RREQ to F3_RREQ are simultaneously supplied from the FIFO devices 38a, 38b, 38c, and 38d to the control circuit 46, the control circuit 46 controls the processing in sequence starting with the demodulated receive data of the highest priority finger, according to the predetermined priority order of fingers 32a, 32b, 32c, and 32d. The priority order is not restricted in any way, but in this embodiment, the order goes to low from the finger 32a, to 32b, to 32c, and then to 32d.

Further, in a case where the request signals F0_RREQ to F3_RREQ are given simultaneously, the control circuit 46 controls the processing in sequence starting with the highest priority demodulated receive data, according to the predetermined priority order of the demodulated receive data. The priority order of the demodulated receive data is not restricted in any way. However, in accordance with this embodiment, the order goes to low from the demodulated receive data D0 to D3, for example. Note that, priority may be given to either the priority order of the fingers 32a, 32b, 32c, and 32d or the priority order of the demodulated receive data D0 to D3.

First, referring to the timing chart shown in FIG. 5, an operation in a case of processing the demodulated receive data will be described. Here, following the sequence of the finger 32a, then 32b, then 32c and then 32d, the processing is performed for the demodulated receive data D0 to D3 of the finger 32a, then for the demodulated receive data D0 to D3 of the finger 32b, then for the demodulated receive data D0 to D3 of the finger 32c, and then for the demodulated receive data D0 to D3 of the finger 32d.

The demodulated receive data D0 to D3 of the fingers 32a, 32b, 32c, and 32d are inputted in sequence into their corresponding FIFO devices 38a, 38b, 38c, and 38d and are held there. At this time, the request signals F0_RREQ, F1_RREQ, F2_RREQ and F3_RREQ which are outputted respectively from the FIFO devices 38a, 38b, 38c, and 38d to the control circuit 46 change simultaneously to high-level signals, as shown in the timing chart shown in FIG. 5.

The control circuit 46 first changes to the F0 state indicated by the state signal STATE. In response to this, the demodulated receive data D0 read out from the read address F0_ADDR=0 of the FIFO device 38a is added together with the data (the initialized data, for example "0") held in the address MEM_ADDR=0 of the memory 44, and this is held in the same address MEM_ADDR=0 of the memory 44 at the timing of the falling of the write signal MEM_WRN.

After that, the acknowledge signal F0_RACK is supplied from the control circuit 46 to the FIFO device 38a, and it is increased in number to the read address F0_ADDR=1 of the FIFO device 38a at the timing of the falling of the acknowledge signal F0_RACK.

The operation is similar thereafter. The demodulated receive data D1 to D3 read out from the read addresses F0_ADDR=1 to 3 of the FIFO device 38a are processed (added cumulatively), and then held in the addresses MEM_ADDR=1 to 3 of the memory 44.

Here, the processing of the demodulated receive data D0 to D3 of the FIFO device 38a ends, and when the request signal F0_RREQ from the FIFO device 38a changes to a low-level signal, the control circuit 46 changes from the F0 state to the F1 state. In this case, as shown in the timing chart shown in FIG. 5, one clock is required to confirm that the request signal F0_RREQ from the FIFO device 38a is a low-level signal and that the request signal F1_RREQ from the FIFO device 38b is a high-level signal, and to change to the F1 state.

Then, in a similar fashion, processing is performed in sequence going from the demodulated receive data D0 to D3 from the FIFO device 38b, then the demodulated receive data D0 to D3 from the FIFO device 38c, and the demodulated receive data D0 to D3 from the FIFO device 38d, and so on.

Here, in the case where four fingers 32a, 32b, 32c, and 32d are provided as in this embodiment, the receive data of the maximum four paths may be all demodulated simultaneously. Therefore, it is necessary to add cumulatively the maximum 16 demodulated receive data (=4 data×4 fingers) in sequence. In such a case, since two clocks are required for reading/writing the memory 44 for each time that one cumulation addition is performed, the minimum number of clocks required for the processing is 32 clocks.

In contrast, in the example shown in FIG. 5, in order to process one of the demodulated receive data, two clocks are required totally. That is, one clock is required to read the data from the memory 44, and one clock is required to write the data to the memory 44, respectively. Further, since one clock is required to change the state of the control circuit 46 from one finger to the next finger, 9 clocks are needed for each finger, thus requiring processing time of 36 clocks for four fingers in total.

Therefore, in the case shown in the timing chart shown in FIG. 5, 4 more clocks are required than the minimum 32 clocks, as described above. Therefore, the frequency of the clock signal CLK is raised so that, for example, two symbol time units≧36 clocks. Accordingly, the number of levels in the FIFO devices 38a, 38b, 38c, and 38d may be, for example, 5.

Next, referring to the timing chart in FIG. 6, an operation in a case of the processing the demodulated receive data will be described. Here, according to a sequence from the receive data D0 to D3, the processing is performed starting with the demodulated receive data D0 of the fingers 32a, 32b, 32c, and 32d, and then the demodulated receive data D1 of the fingers 32a, 32b, 32c, and 32d, then the demodulated receive data D2 of the fingers 32a, 32b, 32c, and 32d, then the demodulated receive data D3 of the fingers 32a, 32b, 32c, and 32d, and so on.

The demodulated receive data D0 to D3 from the fingers 32a, 32b, 32c, and 32d are inputted in sequence into their corresponding FIFO devices 38a, 38b, 38c, and 38d and are held there. At this time, the request signals F0_RREQ, F1_RREQ, F2_RREQ and F3_RREQ which are outputted respectively from the FIFO devices 38a, 38b, 38c, and 38d to the control circuit 46 change simultaneously to high-level signals, as shown in the timing chart shown in FIG. 6.

The control circuit 46 first changes to the F0 state. In response to this, the demodulated receive data D0 read out from the read address F0_ADDR=0 of the FIFO device 38a is added together with the data (the initialized data, for example "0") held in the address MEM_ADDR=0 of the memory 44, and this is held in the same address MEM_ADDR=0 of the memory 44 at the falling timing of the write signal MEM_WRN.

After that, the acknowledge signal F0_RACK is provided from the control circuit 46 to the FIFO device 38a, it is increased in number to the read address F0_ADDR=1 at the falling timing of the acknowledge signal. Further, at the control circuit 46, the priority order of the finger 32a is set as the lowest (last) priority. Accordingly, the finger 32b is automatically set as the highest priority order, and the control circuit 46 enters the F1 state.

In other words, in the case of the example shown in FIG. 6, there is an advantage that, in order to change the state of the control circuit 46 from a finger to the next finger, one clock is not required as in the example shown in FIG. 5. Note that, when logical function description language such as a state machine or other is used to perform the logical design of the control circuit 46, there is an advantage that one only needs to specify that the priority order of each finger 32a, 32b, 32c, and 32d is shifted to the lowest priority after the processing has ended, which is extremely simple.

The subsequent processing is similar. The demodulated receive data D0 of the FIFO devices 38b, 38c and 38d are processed. Next, the processing for the demodulated receive data D1 of the FIFO devices 38a, 38b, 38c, and 38d, the demodulated receive data D2 of the FIFO devices 38a, 38b, 38c, and 38d, and the demodulated receive data D3 of the FIFO devices 38a, 38b, 38c, and 38d are performed in sequence. When the processing for the demodulated receive data D3 of the FIFO devices 38a, 38b, 38c, and 38d is finished, the corresponding request signals F0_RREQ to F3_RREQ change to low-level signals.

In the case of the example shown in FIG. 6, in order to process one of the demodulated receive data, one clock is required to read the data from the memory 44, and one clock is needed to write the data to the memory 44, respectively, thus requiring a total of two clocks. Further, since one clock is not required to change the state of the control circuit 46 from one finger to the next finger, the processing can be completed in 8 clocks for each of the fingers, that is, in a total of 32 clocks for four fingers, which is the minimum number of clocks.

Therefore, in the case of the example shown in FIG. 6, since the processing can be completed in the minimum of 32 clocks, the frequency of the clock signal CLK can be reduced so that two symbol time units=32 clocks, to reduce the power consumption more than in the case of the example shown in FIG. 5. Further, in the case of this embodiment, since the number of levels of the FIFO devices 38a, 38b,

38c, and 38d can be set at minimum number of 4, there is an advantage that the scale of the circuitry for the FIFO can be kept at a minimum.

Note that, in the above-mentioned explanation of the operation, the STTD used in the 3GPP is described by giving an example of the case in which the demodulated receive data is sequentially inputted into the FIFO devices 38a, 38b, 38c, and 38d in units composed of four receive data. However, the present invention is not restricted to this example, and one receive data may serve as the unit from the finger to the FIFO, or two or more receive data may serve as the unit to be inputted.

The RAKE receiver device according to the present invention is basically as described above.

Note that, the constructions of the data synthesis circuits 14 and 36 are not restricted to the examples shown in the diagram, but may have other circuitry structures for realizing the same functions.

Detailed description of the RAKE receiver device according to the present invention has been given above, but the present invention is not restricted to the above-mentioned embodiment, and various improvements and alterations may be made without departing from the gist of the essence of the present invention.

INDUSTRIAL APPLICABILITY

As described in detail above, in the RAKE receiver device according to the present invention, each time the receive data is demodulated by one of the plurality of fingers, the data synthesis circuit adds cumulatively the demodulated receive data for each identical data of each of the paths and synthesizes the data. Further, each time the receive data of the respective paths having been demodulated by the fingers are supplied from the timing adjustment circuit, the data synthesis circuit adds cumulatively the demodulated receive data for each identical receive data of the respective paths, and synthesizes the data.

As a result, in accordance with the RAKE receiver device of the present invention, the necessary memory capacity for the RAKE synthesis can be reduced by up to (1/number of fingers) as compared to the conventional technique, thus enabling the reduction in the scale of the circuitry, and moreover, the reduction in the consumed power.

What is claimed is:

1. A RAKE receiver device comprising:
a plurality of fingers for demodulating receive data of multiple paths;
a data synthesis circuit for synthesizing the receive data from each of the paths and demodulated by the plurality of fingers; and
a timing adjustment circuit for adjusting timing when the receive data from each of the paths and demodulated by the plurality of fingers are provided to the data synthesis circuit,
wherein the timing adjustment circuit holds the receive data from each of the paths and demodulated by the fingers, and each time that the receive data from each of the paths are demodulated by the plurality of fingers are supplied from the timing adjustment circuit, the data synthesis circuit adds cumulatively the demodulated receive data for each identical receive data from each of the paths, and synthesizes the data.

2. A RAKE receiver device, comprising;
a plurality of fingers for demodulating receive data of multiple paths;
a data synthesis circuit for synthesizing the receive data from each of the paths and demodulated by the plurality of fingers,
wherein each time that the receive data from each of the path is demodulated by one of the plurality of fingers, the data synthesis circuit adds cumulatively the demodulated receive data for each identical receive data from each of the paths, and synthesizes the data; and
wherein the data synthesis circuit comprises one memory that is shared by the fingers, and each time the receive data from each of the paths are demodulated by the plurality of fingers, cumulatively added data is read out from each corresponding memory address, added to the demodulated identical receive data from each of the paths, and written back into the same respectively corresponding address of the memory.

3. A RAKE receiver device, comprising;
a plurality of fingers for demodulating receive data of multiple paths,
wherein the fingers are set in advance with priority order;
a data synthesis circuit for synthesizing the receive data from each of the paths and demodulated by the plurality of fingers,
wherein each time that the receive data of each path is demodulated by one of the plurality of fingers, the data synthesis circuit adds cumulatively the demodulated receive data for each identical receive data from each of the paths, and synthesizes the data; and
wherein the data synthesis circuit adds cumulatively, one at a time and in chronological order, the identical receive data from each of the paths and demodulated by the plurality of fingers, and when two or more demodulated receive data from each of the paths are inputted simultaneously, the data synthesis circuit sequentially adds cumulatively the demodulated receive data from each of the paths for each identical receive data, according to the priority order.

4. A RAKE receiver device comprising:
a plurality of fingers for demodulating receive data from multiple paths;
a data synthesis circuit for synthesizing the receive data from each of the paths and demodulated by the plurality of fingers; and
a timing adjustment circuit for adjusting timing when the receive data from each of the paths and demodulated by the plurality of fingers are provided to the data synthesis circuit,
wherein the plurality of fingers demodulate a plurality of receive data per one symbol time unit, the timing adjustment circuit holds the plurality of receive data from each of the paths and demodulated by the plurality of fingers, and each time that the receive data from each of the paths and demodulated by the plurality of fingers are supplied from the timing adjustment circuit, the data synthesis circuit adds cumulatively the demodulated receive data for each identical receive data from each of the paths, and synthesizes the data.

5. A RAKE receiver device according to claim 4, wherein the data synthesis circuit comprises one memory shared by the plurality of fingers, each time that the receive data from each of the paths and demodulated by the plurality of fingers are supplied from the timing adjustment circuit, cumulatively added data is read out from each corresponding memory address, added to the demodulated identical receive data from each of the paths, and written back into the same respectively corresponding address of the memory.

6. A RAKE receiver device according to claim 4, wherein the plurality of fingers and the plurality of receive data are each set in advance with priority order, the data synthesis circuit receives from the timing adjustment circuit the demodulated receive data from each of the paths and adds cumulatively them one at a time and in chronological order, when two or more of the demodulated receive data from each of the paths are held in the timing adjustment circuit, the data synthesis circuit sequentially receives, from the timing adjustment circuit, the same-priority-order demodulated receive data of the plurality of fingers according to the priority order of the fingers, further repeats this operation according to the priority order of the receive data, and sequentially adds cumulatively the demodulated receive data from each of the paths for each identical receive data.

7. A RAKE receiver device according to claim 1, wherein the data synthesis circuit comprises one memory that is shared by the fingers, and each time the receive data from each of the paths are demodulated by the plurality of fingers, cumulatively added data is read out from each corresponding memory address, added to the demodulated identical receive data from each of the paths, and written back into the same respectively corresponding address of the memory.

8. A RAKE receiver device according to claim 1, wherein the fingers are set in advance with priority order, the data synthesis circuit adds cumulatively, one at a time and in chronological order, the identical receive data from each of the paths and demodulated by the plurality of fingers, and when two or more demodulated receive data from each of the paths are inputted simultaneously, the data synthesis circuit sequentially adds cumulatively the demodulated receive data from each of the paths for each identical receive data, according to the priority order.

9. A RAKE receiver device according to claim 2, wherein the fingers are set in advance with priority order, the data synthesis circuit adds cumulatively, one at a time and in chronological order, the identical receive data from each of the paths and demodulated by the plurality of fingers, and when two or more demodulated receive data from each of the paths are inputted simultaneously, the data synthesis circuit sequentially adds cumulatively the demodulated receive data from each of the paths for each identical receive data, according to the priority order.

10. A RAKE receiver device according to claim 5, wherein the plurality of fingers and the plurality of receive data are each set in advance with priority order, the data synthesis circuit receives from the timing adjustment circuit the demodulated receive data from each of the paths and adds cumulatively them one at a time and in chronological order, when two or more of the demodulated receive data from each of the paths are held in the timing adjustment circuit, the data synthesis circuit sequentially receives, from the timing adjustment circuit, the same-priority-order demodulated receive data of the plurality of fingers according to the priority order of the fingers, further repeats this operation according to the priority order of the receive data, and sequentially adds cumulatively the demodulated receive data from each of the paths for each identical receive data.

\* \* \* \* \*